April 8, 1947.   W. R. FOX   2,418,503
DRUM HANDLING DEVICE
Filed March 24, 1945   2 Sheets-Sheet 1
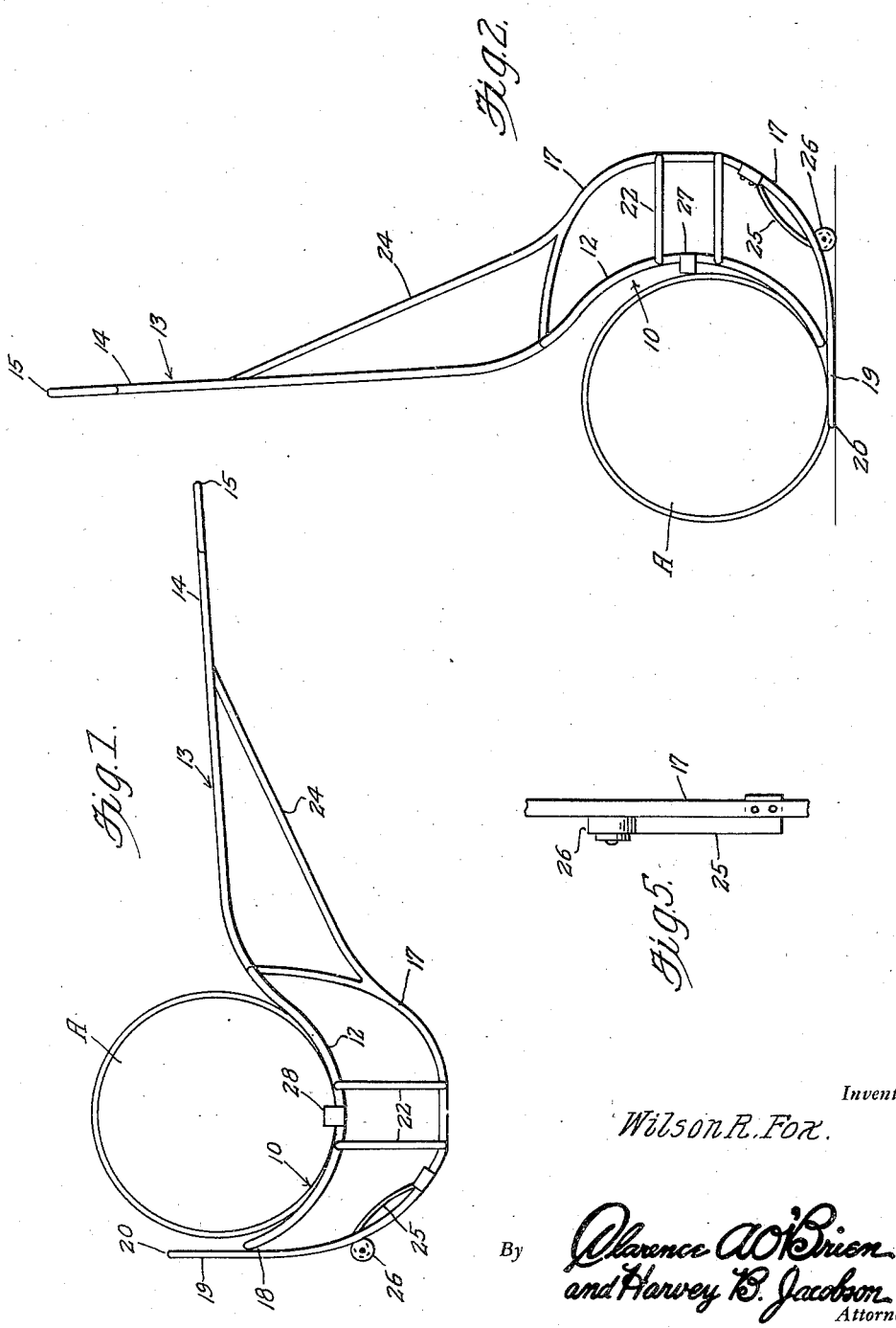
Inventor
*Wilson R. Fox.*
By *Clarence A. O'Brien
and Harvey B. Jacobson*
Attorneys

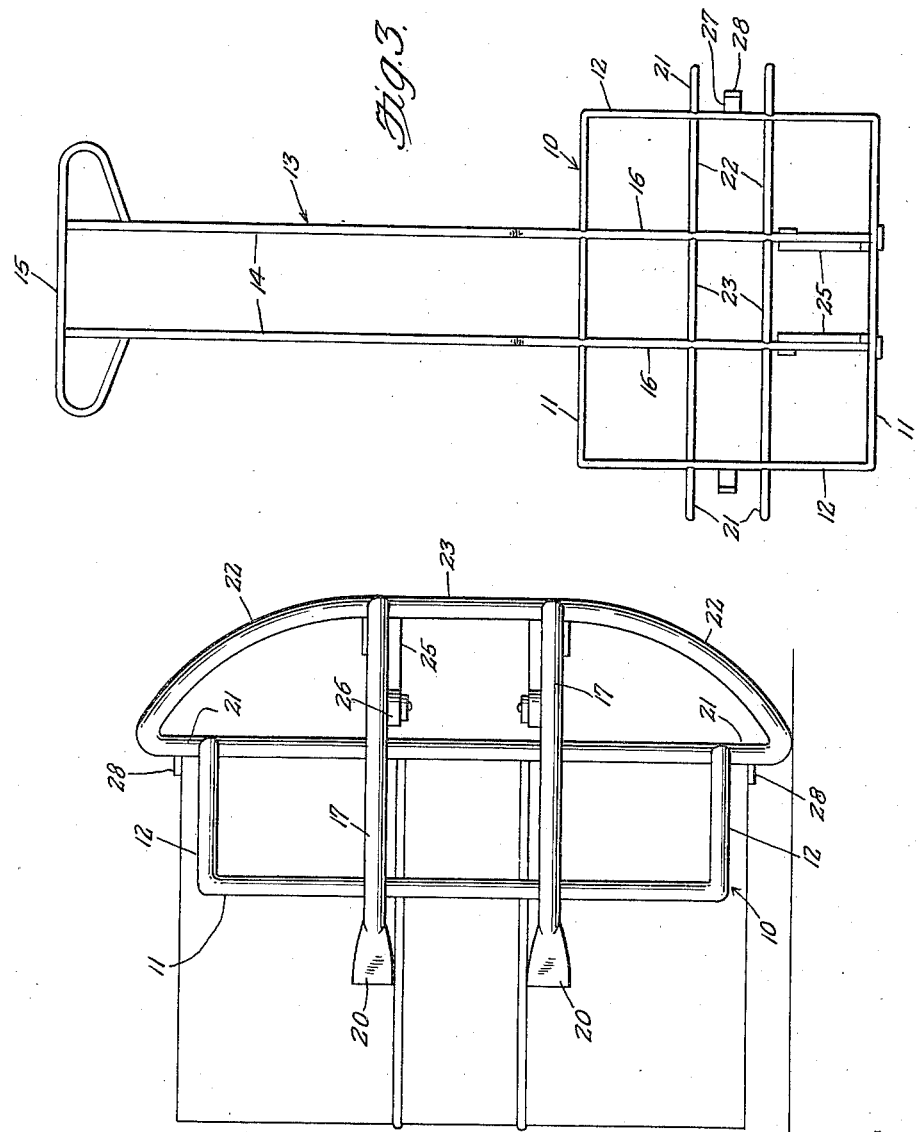

Patented Apr. 8, 1947

2,418,503

UNITED STATES PATENT OFFICE 2,418,503

DRUM HANDLING DEVICE

Wilson R. Fox, Wyandotte, Mich.

Application March 24, 1945, Serial No. 584,585

2 Claims. (Cl. 214—1)

This invention relates to improvements in drum handling devices and more particularly to a device for up-ending a loaded drum such as is used for the storage of fluids or liquids such as oil, carbon tetrachloride or the like.

It is well known that the customary steel drum or barrel usually has a capacity of 55 gallons of liquid and presents quite a problem in handling particularly when it is desired to stand such a container on end. In the storing of containers of this character it is obvious that in order to save space and get as many containers in as small an area as possible that the containers should be turned on end and stacked close to one another. Heretofore the up-ending of such containers has presented considerable difficulty owing to their weight and it has been virtually impossible for one man to up-end a container of this character without help or assistance.

The object of the present invention is to facilitate the up-ending of filled drums and enable the operation to be performed with the minimum use of man-power.

The above and other objects may be attained by employing this invention which embodies among its features a drum supporting cradle having depending therefrom a pair of spaced parallel rockers which extend transversely of the cradle and a similar pair of spaced parallel rockers which extend longitudinally of the cradle, and loading horns for assisting in guiding a drum into the cradle, and a handle by which the cradle may be manipulated for the loading and unloading operation.

In the drawings:

Figure 1 is a side view of a drum handling device embodying this invention showing a drum in loaded position thereon.

Figure 2 is a view similar to Figure 1 showing the drum handling device tilted in position to roll a drum into the cradle.

Figure 3 is a top plan view of the drum handling device.

Figure 4 is a view showing the device rocked into position to discharge an up-ended drum therefrom, and Figure 5 is a detail view showing the roller and its mounting by means of which the device may be readily shifted into drum loading position.

Referring to the drawings in detail my drum handling device comprises a cradle designated generally 10 comprising a pair of parallel side bars 11 joined at opposite ends by arcuate end bars 12. Extending laterally from the cradle is a handle designated generally 13 which comprises a pair of parallel bars 14 joined at their outer ends by a handle member 15 and formed near their opposite ends with curved extensions 16 conforming to the curvature of the arcuate bars 12 and extending transversely through the cradle frame formed by the bars 11 and 12, respectively. The extreme forward ends of the curved portions 16 are welded or otherwise attached to one of the bars 11 at the forward side of the cradle. Depending from the bar 11 on the side of the cradle from which the handle 13 extends and bending forwardly and upwardly as illustrated in Figures 1 and 2, are transverse rocker bars 17 the upper forward ends of which are welded or otherwise attached at 18 to the forward bar 11 of the cradle. These bars terminate in forward extensions 19 which are flattened as at 20 to form loading horns upon which the drum is to be rolled as illustrated in Figure 2.

Projecting outwardly from opposite ends of the cradle are spaced parallel bars 21 from the outer ends of which depend downwardly curving rocker bars 22 which turn inwardly and intersect the rocker bars 17 previously described in a plane below the lowermost portion of the cradle 10 to form a substantially rectangular flattened platform or base 23 immediately below the center of the cradle.

Brace bars 24 extend from the rocker bars 17 as shown in Figures 1 and 2 to the underside of the bars 14 forming the handle 13 and serve to lend rigidity to the unit.

Attached to the bars 17 near the lower end of their upwardly curving portions are spring arms 25 which are bent as shown and carry at their forward ends rollers 26 upon which the device when unloaded may be easily moved into any desired position, it being understood, of course, that the springs 25 are of sufficient weight to support the framework constituting the device when no load is imposed thereon but when the cradle contains a drum these springs will give and allow the cradle to be rocked without interruption.

Projecting outwardly from opposite ends of the cradle between the bars 21 are stop ears 27 having upturned extensions 28 which serve to engage the ends of a drum and prevent endwise movement thereof while it is on the cradle.

In use the device is moved by tipping it to a position so that the wheels 26 will retain the weight thereof and as illustrated in Figure 2 a drum A which may be lying on its side is rolled on the loading horns 19 so that it approaches the cradle 10. Upon pulling downwardly on the handle and rocking the entire unit on the rockers 17 the drum A will be lifted into the position as shown in Figure 1, resting on the cradle 10 between the stops 28. By rotating the handle about its own axis the device may be made to rock on the rockers 22 so as to tip the drum and cradle into a vertical position as shown in Figure 4 whereupon the drum may be unloaded and the device removed and the operation repeated on the next drum until all drums have been up-ended.

All of these operations can be performed by a single operator and a great saving in manpower and labor can thereby be effected.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A drum handling device comprising a drum supporting cradle of substantially arcuate cross section, said cradle including a pair of spaced parallel side bars joined by curved end bars, stops at opposite ends of the cradle, a handle projecting from one side of the cradle, said handle including a pair of spaced parallel bars joined by a handle bar extending transversely therebetween at the end of the handle remote from the cradle, extensions on the spaced parallel bars forming the handle, said extensions being curved to conform to the curvature of the curved end bars of the cradle, a pair of spaced rockers depending from the side bars of the cradle, a pair of spaced parallel bars projecting outwardly from each curved end bar of the cradle, a rocker depending from the extreme outer end of each outwardly projecting bar and curving toward and joining the first-mentioned rockers, springs carried by the rockers on the side of the cradle opposite the handle and rollers carried by the springs and adapted when the device is unloaded to facilitate its movement over a supporting surface.

2. A drum handling device comprising a drum supporting cradle of substantially arcuate cross section, said cradle including a pair of spaced parallel side bars joined by curved end bars, stops at opposite ends of the cradle, a handle projecting from one side of the cradle, said handle including a pair of spaced parallel bars joined by a handle bar extending transversely therebetween at the end of the handle remote from the cradle, extensions on the spaced parallel bars forming the handle, said extensions being curved to conform to the curvature of the curved end bars of the cradle, a pair of spaced rockers depending from the side bars of the cradle, a pair of spaced parallel bars projecting outwardly from each curved end bar of the cradle, a rocker depending from the extreme outer end of each outwardly projecting bar and curving toward and joining the first mentioned rocker, each rocker having a flattened portion intermediate its ends and a substantially rectangular base frame immediately below the center of the cradle formed by the flattened portions of the rockers.

WILSON R. FOX.

REFERENCES CITED

The following references are of record in the file of this patent:

UNITED STATES PATENTS

| Number | Name | Date |
|---|---|---|
| 2,314,478 | Brower | Mar. 23, 1943 |
| 1,759,424 | Strauss | May 20, 1930 |
| 1,914,656 | Walker | June 20, 1933 |
| 1,261,184 | Taylor | Apr. 2, 1918 |
| 480,095 | Holme | Aug. 2, 1892 |

FOREIGN PATENTS

| Number | Country | Date |
|---|---|---|
| 463,933 | German | Aug. 4, 1928 |